UNITED STATES PATENT OFFICE.

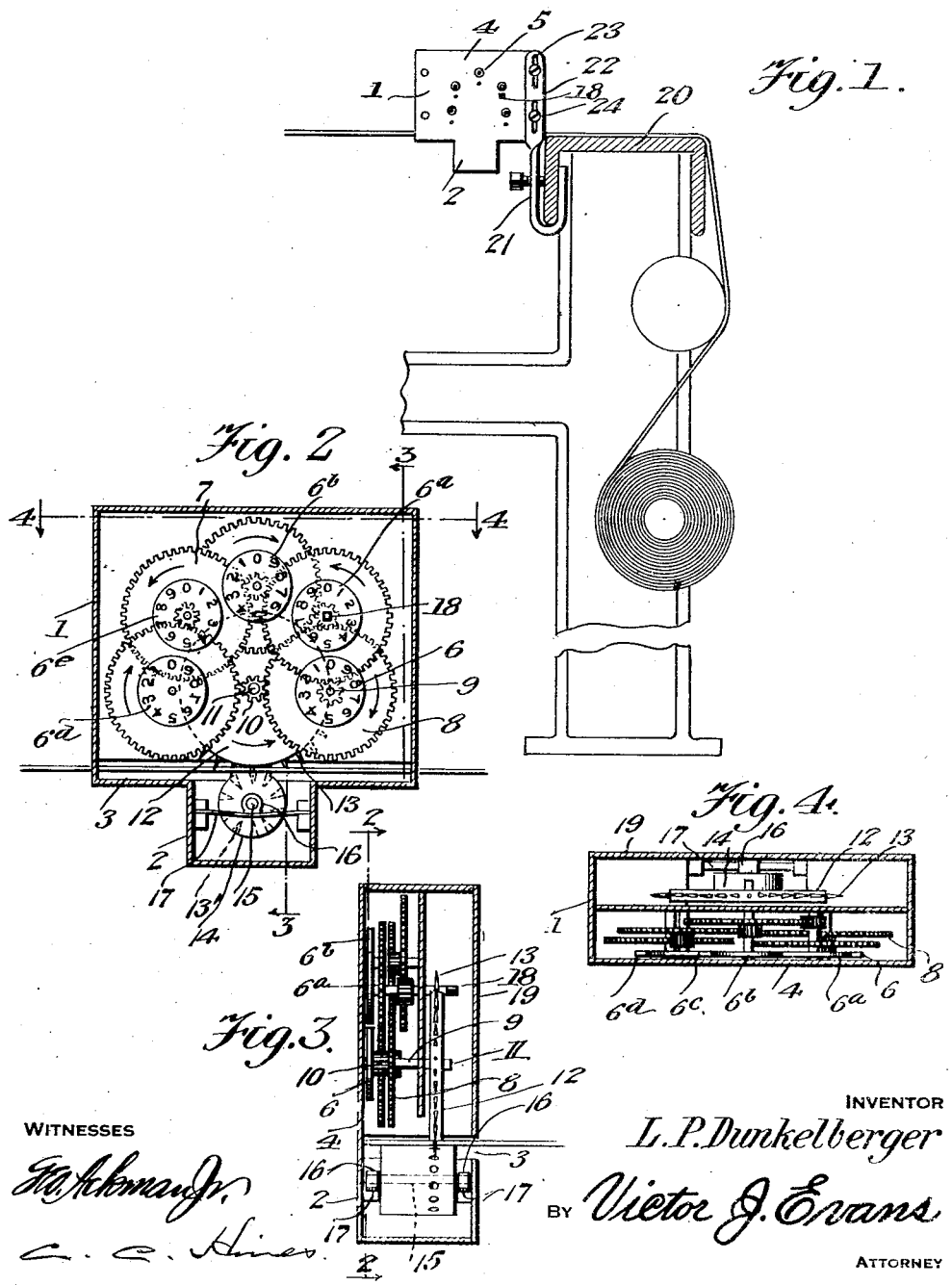

LLOYD P. DUNKELBERGER, OF ALLENTOWN, PENNSYLVANIA.

CLOTH-MEASURING DEVICE.

1,337,891.

Specification of Letters Patent. Patented Apr. 20, 1920.

Application filed April 13, 1918. Serial No. 228,432.

*To all whom it may concern:*

Be it known that I, LLOYD P. DUNKELBERGER, a citizen of the United States, residing at Allentown, in the county of Lehigh and State of Pennsylvania, have invented new and useful Improvements in Cloth-Measuring Devices, of which the following is a specification.

This invention relates to a cloth measuring device for attachment to looms, whereby the amount of cloth woven by the loom within any given period may be instantly and accurately determined, the object of the invention being to provide a measuring device which may be applied to any loom of ordinary construction and which will be positive, reliable and certain in action and adapted for use in connection with different thicknesses or grades of cloth.

The invention consists of the features of construction, combination and arrangement of parts hereinafter fully described and claimed, reference being had to the accompanying drawing in which:—

Figure 1 is a sectional elevation showing the application of the invention to a loom.

Fig. 2 is a vertical longitudinal section on line 2—2 of Fig. 3 through the device as applied to the loom and showing the cloth in feeding position.

Fig. 3 is a vertical transverse section on line 3—3 of Fig. 2.

Fig. 4 is a horizontal section on line 4—4 of Fig. 2.

In carrying my invention into practice, I provide a measuring device comprising a main inclosing casing 1, having a depending portion or chamber 2, in communication at its top with the bottom of the main casing. The main casing is provided at its base with a slot or passageway 3 for the reception and travel of one of the longitudinal edges of the cloth which is being woven. This passage 3 opens through the casing at one side and both ends, and the opposite side or face plate 4 of the casing forms a gage or abutment against which the edge of the cloth bears, and which is designed to serve as a means for determining the full insertion of the cloth for engagement with the parts of the registering mechanism to be operated thereby.

The side or face plate 4 is provided with a series of observation openings 5 therein for the display of indicators for indicating measurements in number of feet or meters, and which may have any desired range of measuring action. In the present instance, I have shown a series of five indicators 6, 6$^a$, 6$^b$, 6$^c$, and 6$^d$, each consisting of a numbered disk, the first representing tenths of units, the second units, the third tens and the fourth hundreds and the fifth thousands, whereby a measuring range of sufficient extent for ordinary use is afforded. These indicators are operated by a train of gearing 7, including a gear 8 on the shaft or arbor 9 of the tenths of units indicator disk, which gear meshes with a pinion 10 on a shaft 11 carrying a measuring wheel 12 having peripheral pointed teeth 13.

The gear 12 has its lower portion projecting downwardly into the plane of the slot or passage 3 so as to bring its teeth 13 into meshing engagement with sockets or recesses 13' in a backing wheel or roller 14 loosely journaled upon a shaft 15 having its ends journaled in bearings 16 carried by leaf spring supports 17 disposed within the chamber 2. The purpose of these spring supports is to permit the backing wheel or roller to have yielding movement toward and from the measuring wheel, as well as rotary motion on its shaft, to adapt it to compensate for varying thicknesses of cloth, the sockets 13' and teeth 13 being of a proper depth to always maintain a meshing engagement between the roller and measuring wheel irrespective of the thickness of the cloth which is being measured through which the teeth of the measuring wheel project. The spring supports yieldingly hold the shaft 15 pressed upward, or toward the cloth to force the backing wheel or roller always into close engagement with the cloth, thus providing an automatic adjustment of the backing roller with respect to the measuring wheel to compensate for variations in the thickness of the cloth so that the positive motion of the measuring wheel in the feed of the cloth will be obtained at all times and under all conditions.

The shaft upon which the indicator 6$^a$ is mounted is provided with an angular end 18, for the reception of a particular form of key, so that the indicating mechanism may be rotated in the direction desired, for the purpose of resetting. The key is inserted through the opening 18' in the side wall 19, so that it may be engaged with the angular end 18 of the shaft.

In practice, the wall or face plate 4, or, in lieu thereof the opposite wall 19 of the casing, may be removable and fastened in position by any suitable means so that access may be obtained to the interior of the casing for cleaning, repairing or renewing the parts of the mechanism as occasion may require, etc., and so that entrance to the interior of the casing by an unauthorized person will be prevented, in order to avoid possible tampering with the indicating mechanism. Hence, access can not be obtained to the casing except by an authorized person, so that the device can not be tampered with in any manner without giving visual evidence of that fact.

The device may be mounted upon the loom in any preferred manner. In the present instance I have shown it mounted upon the breast beam 20, the device being secured to the beam by a clamping bracket 21 provided with an upstanding portion or standard 22 having slots 23 therein receiving adjusting and clamping screws 24, whereby the device may be vertically adjusted to accurately position the slot or passage 3 for the travel of the cloth therethrough according to the thickness of the cloth or other conditions.

From the foregoing description, taken in connection with the accompanying drawing, the construction and mode of operation of my improved measuring device will be readily understood, and it will be seen that the invention provides a device of the character set forth which may be applied to any ordinary type of cloth loom, will accurately measure the cloth as it is woven, will reset itself to compensate for defective cloth removed, and may be manufactured and sold at a low cost while being substantially proof against fraudulent manipulation.

I claim:—

1. A cloth measuring device for attachment to looms comprising a casing divided into separate upper and lower compartments and having a slot opening through its end walls and one of its side walls at the junction of the compartments and forming a passage for the travel of the cloth, a toothed measuring wheel mounted in the upper compartment and projecting into said passage, for engagement with the cloth, a spring pressed backing roller mounted in the lower compartment and having recesses to receive the teeth of the wheel, and indicating mechanism actuated by the wheel in the travel of the cloth.

2. A cloth measuring device comprising a frame or casing having a guideway for the passage of a cloth, a toothed measuring wheel projecting into said guideway, indicating mechanism actuated by said wheel, a backing roller disposed within the guideway, a shaft on which said roller is journaled, transversely disposed flat spring members having their ends secured to the casing and bearings carried by and located intermediate the ends of the said spring members for the reception of each end of the shaft.

In testimony whereof I affix my signature.

LLOYD P. DUNKELBERGER.